Patented Feb. 20, 1934

1,948,287

UNITED STATES PATENT OFFICE 1,948,287

PRODUCTION OF ALKYL PHENOLS

Hyym E. Buc, Roselle, and Reuben Schuler, Elizabeth, N. J., assignors to Standard Oil Development Company, a corporation of Delaware No Drawing. Application June 16, 1932
Serial No. 617,603

12 Claims. (Cl. 260—154)

This invention relates to an improved method for preparing secondary and tertiary alkyl phenols and other alkylated derivatives of hydroxy aromatic compounds. By secondary and tertiary alkyl phenols are meant phenolic compounds containing an alkyl group in which the carbon atom connected to the aromatic nucleus is connected to two or three carbon atoms of the alkyl group.

According to this invention the phenol and an organic compound capable of reacting therewith such as aliphatic or cyclo olefines of more than two carbon atoms and secondary and tertiary aliphatic alcohols are brought into reaction in the presence of strong sulfuric acid and under reaction conditions to permit the formation of a largely or even completely sulfonated reaction product. On hydrolysis of this product there is obtained a product consisting largely of the corresponding secondary or tertiary alkyl phenols in a yield of about 50 to 95%. This invention represents a marked improvement in the art of producing alkyl phenols as it has heretofore been possible to obtain yields of usually not more than 20 to 30% of alkyl phenols with at least an equal formation of corresponding alkyl aryl ethers. The alkyl phenols are very powerful germicides and fungicides and hence are greatly desired while the ethers are of little value and normally represent a loss of the reactants used. Our invention will be understood from the following examples which illustrate preferred methods for conducting the improved process:

Example 1

490 grams of phenol are mixed with 615 cc. of 2-hexene (boiling point 67.7 to 68° C.). 560 cc. of 95% sulfuric acid are added slowly with stirring and cooling to maintain the reaction temperature at about 50 to 60° C. during the addition of acid which requires about one hour. The reaction mixture is stirred at room temperature for about three hours and is then allowed to stand until the reaction is substantially completed, say from 6 to 24 hours. The reaction mass amounting to 1460 cc. is then diluted with an equal volume of water. The mixture, then containing about 67 grams of total sulfuric acid per 100 cc. of water, is heated in a sealed autoclave at 180° C. for about two hours. The mixture is then cooled and allowed to separate into oily and aqueous acid layers. The oily layer is withdrawn, washed with water and extracted with aqueous caustic soda to separate alkyl phenols from alkyl phenyl ethers. The alkyl phenols are subsequently recovered by acidification of the alkali extract with hydrochloric acid. There are thus obtained 810 grams of the washed oil layer (91% yield) containing 70% of secondary hexyl phenol and 30% of secondary hexyl phenyl ether and other aqueous alkali insoluble products. Instead of an alkali extraction, the washed oil may be distilled in vacuo. The fraction boiling up to 150° C. at 1 mm. pressure is about 90% alkali soluble. The fraction boiling above 150° C. contains mainly alkali insoluble matter.

Example 2

1200 cc. of a distillate boiling between 60 and 72° C. obtained from the naphtha produced in cracking a gas oil at 750 pounds per square inch pressure are mixed with 370 grams of phenol ($C_6H_5OH$). To this mixture 216 cc. of 95% sulfuric acid are added slowly with stirring and cooling to maintain the temperature of the mixture below about 60° C. When the addition of acid is completed the mixture is stirred at room temperature (without heating or cooling) for about 2 hours. It is then heated on a water bath to about 100° C. to remove the unreacted petroleum fraction. 900 cc. of a residue are thus obtained. This residue is diluted with water to obtain 1800 cc. of diluted mixture which contains about 38 grams of total sulfuric acid per 100 cc. of water. This mixture is then heated in a sealed autoclave at 180° C. for 2 hours. On cooling a top oily layer and a bottom acid layer separate. The oil layer is withdrawn and washed with water to remove acid. There are thus obtained 675 grams of washed oily product representing a 98% yield based on the olefines in the petroleum fraction treated. 95% of this product is soluble in a 10% aqueous solution of sodium hydroxide and consists mainly of a mixture of secondary and tertiary hexyl phenols. The remaining 5% of alkali insoluble product is a mixture of corresponding hexyl phenyl ethers and possibly high boiling polymers of the original olefines. The alkyl phenol fraction may be purified by distillation with steam or under vacuum, or by other suitable methods. The washed oily product may be distilled in vacuo. The fraction distilling below 150° C. at 1 mm. pressure consists almost completely of alkyl phenols. The residue is a viscous tarry mass, insoluble in alkali.

Example 3

47 grams of phenol are mixed with 63 cc. of secondary hexy alcohol. 56 cc. of 95% sulfuric acid are then added slowly and the reaction is conducted under the same conditions shown in Example 1. The reaction mixture is then diluted with an equal volume of water and is heated in a sealed autoclave at 180° C. for about 2 hours. The hydrolyzed product is then cooled and the oil layer is withdrawn and washed with water. There is thus obtained a 77% yield of the washed oil layer of which 76% (58.5% on original alcohol) is soluble in a 10% aqueous solution of caustic soda and consists almost entirely of secondary hexyl phenol. The alkali insoluble fraction is substantially secondary hexyl phenyl ether.

If the processes shown above are conducted at lower reaction temperatures and with lesser amounts of sulfuric acid so as to avoid any substantial sulfonation of the reaction product, there is usually obtained a total yield of usually not more than 50% of alkylated phenolic derivatives which product contains usually 50% or more of alkyl phenyl ethers.

The hydrolysis of the sulfonated reaction product is preferably conducted at a temperature above about 120° C. The rate of hydrolysis of sulfonated alkyl phenols with liquid water at lower temperatures is so slow as to be unsatisfactory for commercial operation. A rapid rate of hydrolysis may be secured with liquid water at 150 to 180 or 200° C. Higher temperatures may be used but care must be taken to prevent polymerization and/or carbonization of the reaction mixture at such elevated temperatures. It is desirable that the concentration of acid (proportion of total sulfuric acid to free water, grams per 100 cc.) should preferably be not greater than about 70 during the hydrolysis as acids of high concentration cause formation of tarry material during this step. Acid concentrations of 15 to 65 grams per 100 cc. of water are suitable although somewhat higher or lower concentrations may be used with appropriate regulation of the time and temperature of the hydrolysis.

Distillation of the sulfonated reaction product at atmospheric or lower pressures with steam or even with highly superheated steam is ineffective to hydrolyze any appreciable amount of sulfonated alkyl phenols. If the distillation is conducted with saturated steam the rate of hydrolysis of such compounds is negligible, while if superheated steam is used the product becomes rapidly charred due to concentration of the sulfuric acid.

Our process is applicable to secondary and tertiary olefines, aliphatic and cyclo olefines of more than 2 carbon atoms and to secondary and tertiary aliphatic alcohols. Pure or mixed olefines or compositions containing olefines and inert diluents such as paraffin hydrocarbons may be used in this process. For example, cracked petroleum hydrocarbon mixtures such as light cracked naphthas and cracked petroleum gases may be used and highly desirable products containing mixed alkyl phenols corresponding to the olefines present are thereby secured directly. In addition to phenol other hydroxy aromatic compounds such as cresol, resorcinol, hydroquinone, pyrogallol and hydroxy compounds containing condensed nuclei such as naphthols may also be used.

For the following claims the term "branched alkyl phenol" is used to designate a phenol or other hydroxy aromatic compound such as cresol, resorcinol, hydroquinone, pyrogallol, naphthol and the like having one or more secondary or tertiary aliphatic or cyclic paraffinic radicals.

This invention is not to be limited to any specific examples which are described solely for purpose of illustration but only by the following claims in which we wish to claim all novelty insofar as the prior art permits.

We claim:

1. Improved process for obtaining valuable derivatives from phenols comprising bringing a mixture of a phenol and a compound selected from the class consisting of secondary and tertiary alcohols and olefines of more than 2 carbon atoms slowly into contact with strong sulfuric acid, forming a reaction product containing sulfonated alkyl phenolic derivatives, and subsequently converting said sulfonated phenolic derivatives into the corresponding phenolic derivatives and sulfuric acid.

2. Process according to claim 1 in which said strong sulfuric acid is of less than 100% strength.

3. Process according to claim 1 in which the sulfonated phenolic derivatives are converted into the corresponding phenolic derivatives by hydrolysis.

4. Process according to claim 1 in which the sulfonated phenolic derivatives are converted into the corresponding phenolic derivatives by hydrolysis with liquid water at a temperature of 120 to 200° C.

5. Improved process for preparation of branched alkyl phenol comprising bringing a mixture of a phenol and a compound selected from the class consisting of secondary and tertiary alcohols and olefines of more than 2 carbon atoms slowly into contact with strong sulfuric acid of less than 100% strength, forming a substantially completely water soluble reaction product comprising sulfonated alkyl phenol, subsequently converting said sulfonated reaction product into the corresponding alkyl phenol and sulfuric acid.

6. Process according to claim 5 in which said sulfonated reaction product is heated in the presence of liquid water at a temperature of 120 to 200° C. and a product comprising an alkyl phenol is formed.

7. In the production of branched alkyl phenolic derivatives by reaction of a phenol and a hydrocarbon selected from the class comprising aliphatic and cyclo olefines of more than 2 carbon atoms in the presence of strong sulfuric acid of less than 100% strength, an improved method for preparing a product comprising alkyl phenolic derivatives consisting of a major proportion of branched alkyl phenol and a minor proportion of branched alkyl phenyl ether, which comprises bringing a mixture of phenol and hydrocarbon slowly into contact with said acid under conditions to produce a substantially completely water soluble sulfonated reaction product and subsequently hydrolyzing said reaction product with liquid water at a suitable temperature above about 120° C.

8. Method according to claim 7 in which the reaction product is digested for an extended time at a temperature below about 100° C. prior to the said hydrolysis.

9. Method according to claim 7 in which the reaction of hydrocarbon, phenol and sulfuric acid is conducted in the presence of an added liquid paraffin hydrocarbon.

10. Method according to claim 7 in which the mixture subjected to the said hydrolysis contains 15 to 65 grams sulfuric acid per 100 grams water, on the total sulfuric acid used and water present.

11. Method according to claim 7 in which the hydrolyzed product is cooled and the resulting oil layer is extracted with aqueous alkali to separate the alkyl phenols.

12. Method according to claim 7 in which the hydrolyzed oily reaction product is subjected to vacuum distillation to separate alkyl phenols from alkyl aryl ethers.

HYYM E. BUC.
REUBEN SCHULER.